(12) United States Patent
Liu et al.

(10) Patent No.: US 8,808,897 B2
(45) Date of Patent: Aug. 19, 2014

(54) ELECTRODE STRUCTURE OF VANADIUM REDOX FLOW BATTERY

(75) Inventors: Mao-huang Liu, New Taipei (TW); Kuan-yi Lee, New Taipei (TW)

(73) Assignee: Fu Jen Catholic University, New Taipei (TW)

( * ) Notice: Subject to any disclaimer, the term of this patent is extended or adjusted under 35 U.S.C. 154(b) by 673 days.

(21) Appl. No.: 13/185,919

(22) Filed: Jul. 19, 2011

(65) Prior Publication Data

US 2013/0022846 A1    Jan. 24, 2013

(51) Int. Cl.
  *H01M 8/18*   (2006.01)
  *H01M 8/20*   (2006.01)
  *H01M 4/96*   (2006.01)

(52) U.S. Cl.
  CPC ............... *H01M 8/188* (2013.01); *H01M 4/96* (2013.01); *Y02E 60/528* (2013.01)
  USPC ....................................................... 429/105

(58) Field of Classification Search
  USPC ....................................................... 429/105
  See application file for complete search history.

(56) References Cited

U.S. PATENT DOCUMENTS

2008/0292964 A1*   11/2008   Kazacos et al. ............ 429/231.5

* cited by examiner

*Primary Examiner* — Ula C Ruddock
*Assistant Examiner* — Frank Chernow
(74) *Attorney, Agent, or Firm* — Muncy, Geissler, Olds & Lowe, P.C.

(57) ABSTRACT

An electrode structure of a vanadium redox flow battery is disclosed, which includes a proton-exchange membrane, two graphite papers, two graphite felt units, two pads, two graphite polar plates, two metal plates and a lock-fixing device which are symmetrically stacked in sequence from center to outside. wherein each graphite polar plate has the flow channels with a grooved structure, and each graphite felt unit is embedded in the flow channels of one of the graphite polar plates, and then the graphite felt units are covered by the graphite papers such that the different electrolytes flow in their corresponding flow channels. The storage tanks of vanadium electrolyte are connected through the connection pipelines, and the redox reaction is performed through the flows of the vanadium electrolyte. The electrode structure of the vanadium redox flow battery can be stacked for forming a large-scale electrode structure to increase the electrical power.

8 Claims, 5 Drawing Sheets

ELECTRODE STRUCTURE OF VANADIUM REDOX FLOW BATTERY

BACKGROUND OF THE INVENTION

1. Field of the Invention

The present invention relates to an electrode structure of a vanadium redox flow battery, and particularly to an electrode structure of a vanadium redox flow battery in which the graphite felt units are embedded in the flow channels of graphite polar plates.

2. The Prior Arts

With the rising environmental protection awareness and the upcoming era of high gasoline price, the energy-related companies and governments worldwide have been trying to develop the renewable green energies, which are produced by the ocean waves or tides, geothermal energy, wind energy, and solar cells, to replace the conventional petrochemical energies which will be run out eventually. Because the fluctuations of electrical energy produced by the renewable green energy are great, an auxiliary energy storage system is often needed to store excessive electrical energy or to stabilize the electrical current, so that the electrical energy can be stored when the electrical energy generation is abundant, and can be fed back to the electricity network when the electrical energy generation is not enough.

A redox flow battery is often used in an energy storage system. Just like the fuel batteries, the electrode of a redox flow battery is only involved in catalysis, but not involved in the reaction, and thereby the electrode would not be consumed or enlarged. The reactants in the sulfuric acid solutions are fed into the cell stack from the external tank, and electrochemically reacted to form the products with chemical energy, and then the electrochemical products are stored in the external tank. The stored chemical energy can be also converted into the electrical energy when the electrochemical products are released from the external tank to the cell stack for discharging. Therefore, the redox flow battery is very suitable to be used in the electrical charging or discharging.

The vanadium redox flow battery (VRB) has the advantages of fast response time, high performance/price ratio, flexible design, and a long cycle life, etc. The vanadium redox flow battery has received a lot of attention of the researchers, and is very suitable to be used as a large-scale energy storage device.

FIG. 1 is a schematic view showing a conventional vanadium redox flow battery. As shown in FIG. 1, the conventional vanadium redox flow battery includes a plurality of positive electrode plates 10, a plurality of negative electrode plates 20, a positive electrolyte 30, a negative electrolyte 40, a positive electrolyte external tank 50, and a negative electrolyte external tank 60. The positive electrolyte 30 and the negative electrolyte 40 are respectively stored in the external tank 50 and the external tank 60. At the sometime, the positive electrolyte 30 and the negative electrolyte 40 respectively pass through the positive electrode plates 10 and the negative electrode plates 20 via the positive connection pipelines and the negative connection pipelines to form the respective loops themselves indicated as the arrows shown in FIG. 1. Pumps (not shown) are often installed on the connection pipelines for continuously transporting the electrolytes to the electrode plates.

Moreover, a power conversion unit 90, e.g. a DC/AC converter, can be used in a vanadium redox flow battery, and the power conversion unit 90 is respectively electrically connected to the positive electrode plates 10 and the negative electrode plates 20 via the positive connection lines 70 and the negative connection lines 80, and the power conversion unit 90 also can be respectively electrically connected to an external input power source 92 and an external load 94 in order to convert the AC power generated by the external input power source 92 to the DC power for charging the vanadium redox flow battery, or convert the DC power discharged by the vanadium redox flow battery to the AC power for outputting to the external load 94.

Generally, the sulfuric acid solutions containing the vanadium ions in different oxidation states, namely the redox couples of V(IV)/V(V) and V(II)/V(III), are respectively served as the positive electrolyte 30 and the negative electrolyte 40, and the following electrochemical reaction will be performed:

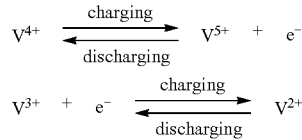

The advantages of a vanadium redox flow battery includes:
(1) The size of the cell stack determines how much power can be charged and discharged in the vanadium redox flow battery. i.e. the surface area of the electrode, the number of the single cells; and the amount of electrolyte determines how much energy can be stored in the vanadium redox flow battery, and thereby the vanadium redox battery having large scale storage capacity can be flexibly installed.
(2) No phase transformation is involved, and thereby the cycle life of the vanadium redox flow battery is greatly prolonged.
(3) The deep-discharge damage to the battery can be prevented.
(4) The vanadium redox flow battery can be instantly charged and discharged.
(5) The electrolyte storages are stable, and thereby vanadium redox flow battery can be preserved over a long period of time because of its low self-discharge rate.
(6) The battery structure is simple, and thereby the maintenance is easy.
(7) The same active substance is utilized in the positive and negative electrodes, and there are no problems of cross-contamination when the active substance penetrates through the separator.

Accordingly, by using the vanadium redox flow battery, the problem of intermittent power generation of renewable energy can be solved, so that the uncertainty for supplying power to the electricity network using the renewable energy is improved. As present, the vanadium redox flow battery is applied to: (1) an electric power company for massively storing the electricity and balancing the load; (2) a mid-scale electricity user, factory, company, and building in the remote area for providing them electric power or emerging electric power systems; (3) a home user; and (4) an auxiliary energy storage equipment for renewable energy such as wind or solar energy.

However, the disadvantages of the above-mentioned conventional flow battery include the dead volume and concentration polarization of the electrolyte, which would cause the decrease of the efficiency of the electron transfer in a battery so that the energy efficiency is decreased. Therefore, there is a need for providing a vanadium redox flow battery in which the electrode has an increased reaction area, and an efficient charge transfer so that the electric current density can be increased, and the energy efficiency can be improved in order to solve the problems of the conventional flow battery described above.

SUMMARY OF THE INVENTION

Accordingly, the objective of the present invention is to provide an electrode structure of a vanadium redox flow battery, which comprises: a proton exchange membrane; two graphite papers, sandwiching the proton exchange membrane between them; two pads, each pad respectively has a single hole or a plurality of holes, the two pads sandwiching the two graphite papers in such a manner that the single hole or the holes of each pad are covered by the two graphite papers; two graphite felt units, having a multistrip structure; and two graphite polar plates, sandwiching the two pads, each graphite polar plate having one or a plurality of flow channels with a grooved structure on a surface thereof, each graphite felt unit having the multistrip structure being embedded in the flow channels of one of the graphite polar plates, and the two graphite felt units being covered by the two graphite papers, wherein the flow channels are served to allow a first electrolyte and a second electrolyte having vanadium ions in different oxidation states to flow through, and by the electrochemical reaction of the vanadium ions in the first electrolyte and the second electrolyte, an electrical energy is generated and is output to the external load, or the external electrical energy is converted into chemical energy stored in the vanadium ions. The proton-exchange membrane is served as a separator for isolating the electrolytes at two sides for forming an electric current loop.

The electrode structure of the present invention can be used in a vanadium redox flow battery. The problems of the above-mentioned conventional flow battery including the dead volume and concentration polarization of the electrolyte can be improved by using the electrode structure of the present invention. Meanwhile, in the present invention, the efficiency of electrochemical energy conversion can be increased because the designed electrodes have relatively large reaction area.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
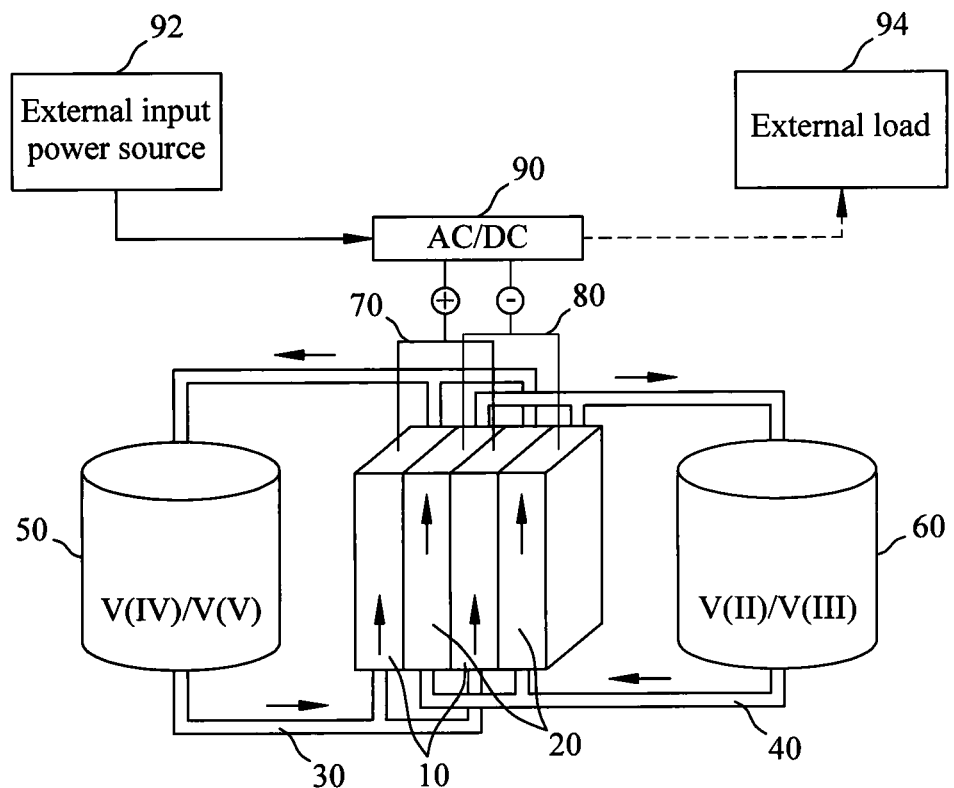
FIG. 1 is a schematic view showing a conventional vanadium redox flow battery.
Figure 2:
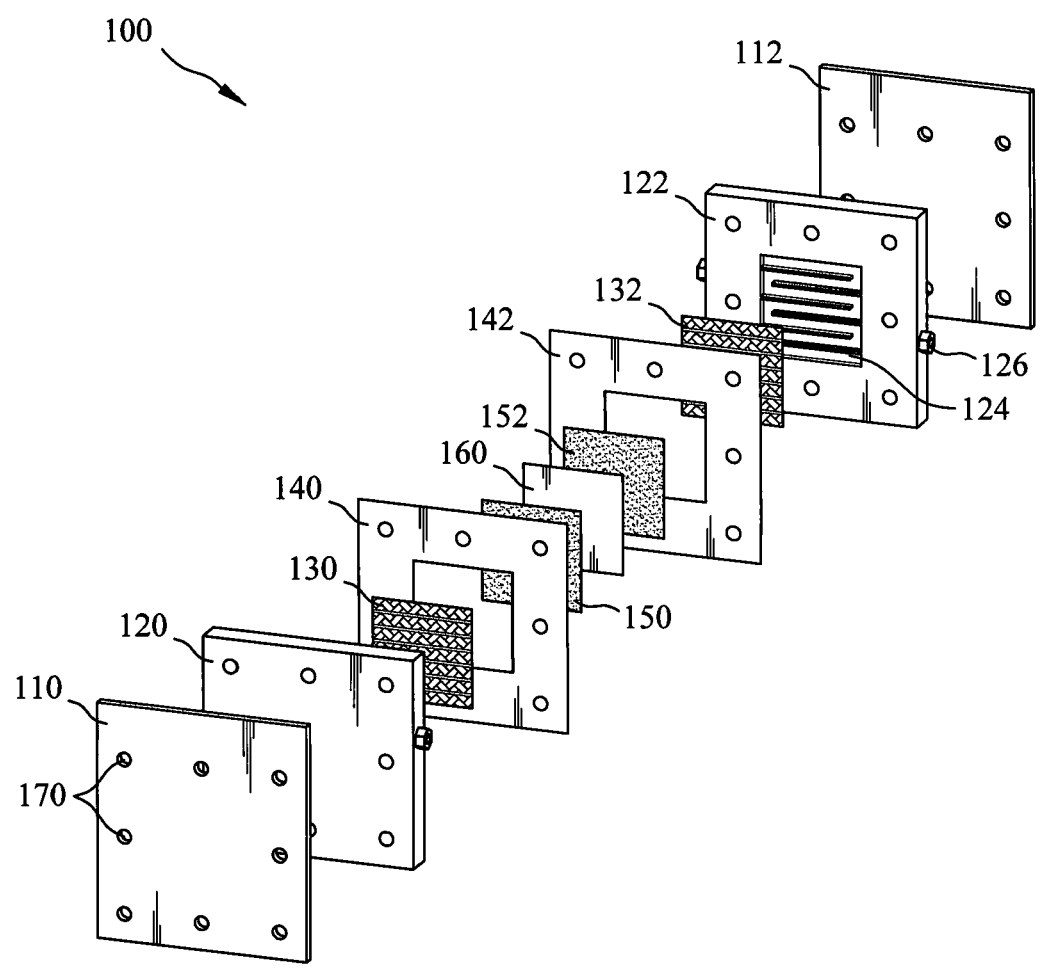
FIG. 2 is a schematic view showing the electrode structure of the vanadium redox flow battery according to the present invention.

FIG. 2 is a schematic view showing the electrode structure of the vanadium redox flow battery according to the present invention. FIG. 2 shows the electrode structure of a single cell of the vanadium redox flow battery, which is used as an example for illustrating the present invention. However, a plurality of single cells as shown in FIG. 2 can be stacked together to form a large electrode assembly. As shown in FIG. 2, the electrode structure 100 of the vanadium redox flow battery of the present invention comprises two metal sheets 110, 112, two graphite polar plates 120, 122, two graphite felt units 130, 132, two pads 140, 142, two graphite papers 150, 152, and a proton-exchange membrane 160. The metal sheets can be made of an electrical conductive metal such as copper sheets.

According to the present invention, the graphite felt units 130, 132 and the graphite papers 150, 152 are porous, and the graphite felt units 130, 132 are with a multistrip structure.

The two graphite papers 150, 152 sandwich the proton-exchange membrane 160 between them, and the two pads 140, 142 sandwich the two graphite papers 150, 152 between them, wherein the pads 140, 142 respectively have a single hole or a plurality of holes, and the rectangular holes in the pads 140, 142 shown in FIG. 2 are used as an example for illustrating the present invention, and however, the shape of the single hole or the plurality of holes can be rectangular, circular, oval, prism, triangular, or polygon.

The two graphite polar plates 120, 122 respectively have a plurality of flow channels with a grooved structure on the surface thereof facing the graphite felt units 130, 132, so that the graphite felt units 130, 132 with a multistrip structure can be embedded in the corresponding flow channels of the two graphite polar plates 120, 122, respectively, and the flow channels pass through the single hole or the plurality of holes of the two pads 140, 142. Then the two graphite polar plates 120, 122 sandwich the two pads 140, 142 between them, and then the two metal sheets (or copper sheets) 110, 112 sandwich the two graphite polar plates 120, 122 between them, and the lock-fixing device (not shown), such as a screw, is used to fix the proton-exchange membrane 160, the two graphite papers 150, 152, the two graphite felt units 130, 132, the two pads 140, 142, the two graphite polar plates 120, 122, and the two metal sheets 110, 112 all together through a plurality of the through holes 170.

In the electrode structure 100 of the vanadium redox flow battery according to the present invention, the metal sheet 110, the graphite polar plate 120, the graphite felt unit 130, the pad 140, the graphite paper 150, the proton exchange membrane 160, the graphite paper 152, the pad, 142, the graphite felt unit 132, the graphite polar plate 122 and the metal sheet 112 are stacked together in sequence as shown in FIG. 2.

Figure 3:
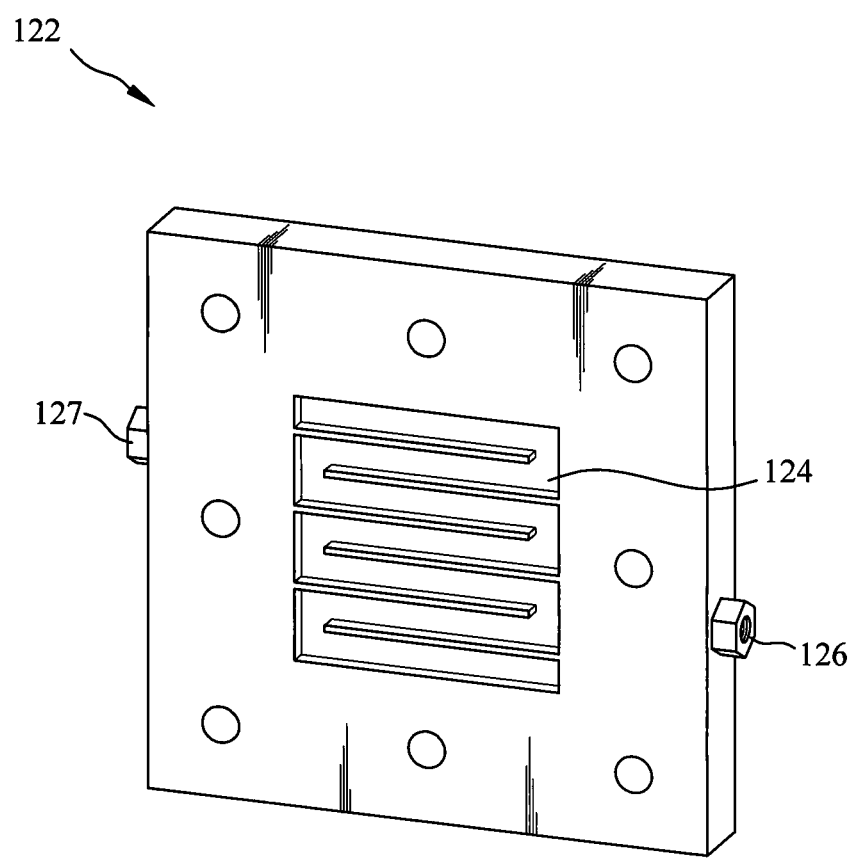
FIG. 3 is a schematic view showing the graphite polar plate according to the present invention.

Moreover, the two graphite polar plates 120, 122 are respectively installed with the fast joints at the two opposite lateral sides, and the two fast joints respectively installed at the two opposite lateral sides are used as an inlet and an outlet for the electrolyte to allow the electrolyte to flow through the flow channels. As shown in FIG. 3, the graphite polar plate 122 includes a flow channel with a grooved structure 124 and two fast joints 126, 127 connected to the external tank. However, although the flow channel 124 as shown in FIG. 3 has a single-serpentine flow field pattern, the flow channel 124 can also have a design that has a plurality of serpentine flow fields, a single or a plurality of interdigitated flow fields, or a single or a plurality of parallel flow fields.

Figure 4:
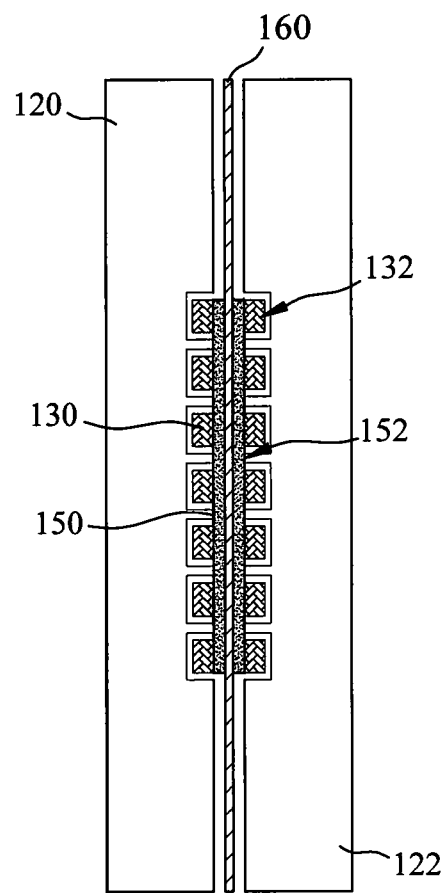
FIG. 4 is a schematic view showing the simplified electrode structure assembly according to the present invention.

FIG. 4 is a schematic view showing a simplified assembly of the electrode structure according to the present invention. The structure of the core reaction area where an electrochemical reaction is carried out is shown in FIG. 4. In FIG. 4, for simplification, only the two graphite polar plates 120, 122, the two graphite felt units 130, 132, the two graphite papers 150, 152, and the proton-exchange membrane 160 are shown, but the two pads 140, 142 are not shown. The two graphite felt units each has a multistrip structure 130, 132 are embedded in the flow channels of the two graphite polar plates 120, 122, respectively, and the two graphite papers 150, 152 respectively cover the flow channels for covering the two graphite felt units 130, 132, so that a highly efficient composite electrode structure including the graphite felt units, the graphite papers, and the graphite polar plates made of graphite material is obtained. Furthermore, the two graphite papers 150, 152 are respectively attached to the two lateral sides of the proton-exchange membrane 160.

The positive electrolyte and the negative electrolyte having vanadium ions in different oxidation states are fed from the external tanks can flow through their corresponding flow channels, and the proton-exchange membrane 160 is used as a separator so as to form an electric current loop. For example, a first electrolyte containing divalent and trivalent vanadium ions, and a second electrolyte containing tetravalent and pentavalent vanadium ions are utilized, and by the electrochemical reactions of the vanadium ions in the first electrolyte and the second electrolyte, an electrical energy is generated and is output to the external load, or the external electrical energy is converted into chemical energy which is stored in the vanadium ions. Specifically, the first electrolyte has divalent and trivalent vanadium ions, and the second electrolyte has tetravalent and pentavalent vanadium ions, and when the external electrical energy is applied onto the vanadium redox flow battery, the trivalent vanadium ions in the first electrolyte are converted to divalent vanadium ions, and the tetravalent vanadium ions in the second electrolyte are converted to pentavalent vanadium ions, and when the electrical energy is output to the external load, the divalent vanadium ions in the first electrolyte are converted to trivalent vanadium ions and the pentavalent vanadium ions in the second electrolyte are converted to tetravalent vanadium ions.

The graphite felt is made of 2 to 20 µm of carbonized and high-temperature graphitized original fibers of polyacrylonitrile (PAN), mesophase pitch, cellulose, acrylic, phenol, or aromatic polyamide. The thickness of each graphite felt unit having a multistrip structure is from 3.0 to 8.0 mm, and the bulk density of each graphite felt unit is larger than 0.09 g/cm$^3$ and smaller than 0.20 g/cm$^3$, and the electrical resistivity of each graphite felt unit is smaller than 200 mΩ·cm, and a d-spacing ($d_{002}$) in graphite layers of the graphite felt is smaller than 3.5 Å.

The graphite paper is made of 2 to 20 µm of carbonized or high-temperature graphitized original fibers of polyacrylonitrile (PAN), mesophase pitch, cellulose, acrylic, phenol, or aromatic polyamide. The thickness of each graphite paper is from 0.1 to 1.0 mm, and the bulk density of each graphite paper is larger than 0.30 g/cm$^3$ and smaller than 0.60 g/cm$^3$, and the electrical resistivity of each graphite paper is smaller than 100 mΩ·cm, and a d-spacing ($d_{002}$) in graphite layers of the graphite papers is smaller than 3.5 Å.

Figure 5:
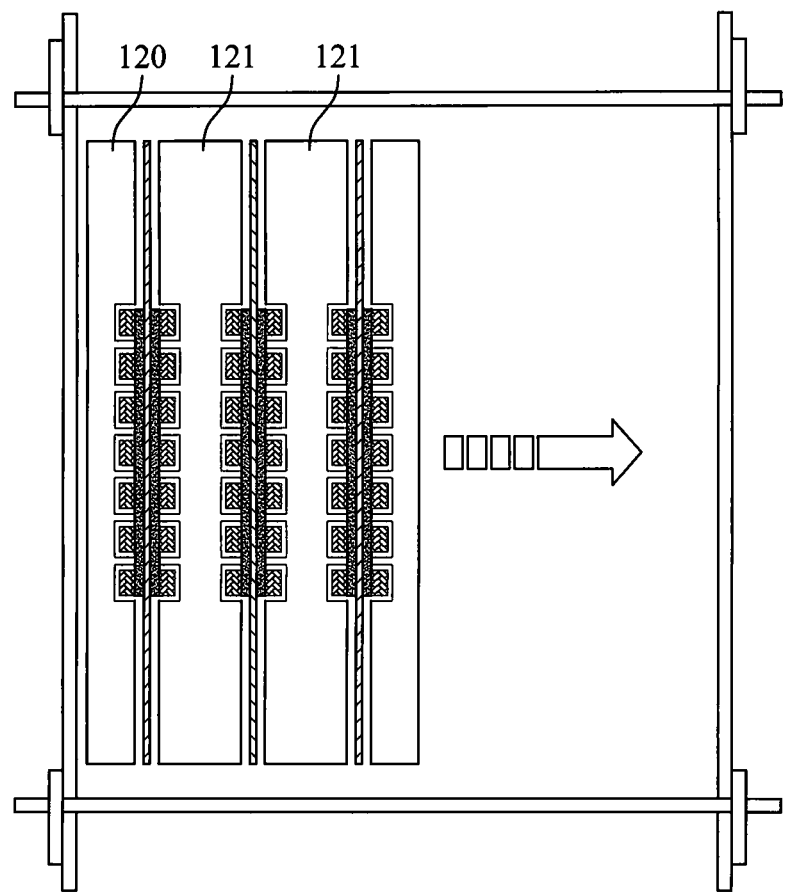
FIG. 5 is a schematic view showing the stacked electrode structure assembly according to the present invention.

The graphite polar plate can be made of natural graphite or artificial graphite, the thickness of the graphite current collector is preferably to be 10 to 20 mm, and the bulk density of the graphite current collector is larger than 1.90 g/cm$^3$, and the electrical resistivity of the graphite current collector is smaller than 0.03 mΩ·cm, and a d-spacing ($d_{002}$) in graphite layers of the graphite polar plate is smaller than 3.38 Å. The pad is made of polytetrafluoroethylene (PTFE) or the so-called Teflon. Moreover, the two graphite polar plates can be formed as a bipolar cell structure. The two facing surfaces of the two graphite polar plates respectively have the flow channels to allow the different electrolytes to flow through. A large-scale composite electrode structure can be formed by stacking a plurality of single cells for increasing the electrical power. FIG. 5 is a schematic view showing a stacked electrode structure according to the present invention, in which the graphite current collector 120 has the flow channels on one surface, and the graphite current collector 121 has the flow channels on two opposite surfaces. The arrow shown in FIG. 5 represents the stacking direction of the graphite polar plates.

The important features of the present invention are that a high efficiency composite electrode structure is obtained by assembling the graphite felt units, the graphite papers and the graphite polar plates together, and the graphite current collector itself has the flow channels for allowing the electrolyte to flow through so that the problems of the dead volume and the concentration polarization of the electrolyte can be decrease. Meanwhile, the reaction area of the electrode is increased by the combination of the graphite felt units and the graphite papers so that the charge transfer becomes more efficient, and the energy conversion can be improved. The structure of electrode provided by the present invention can be applied to a vanadium redox flow battery, which is suitable for balancing the peak and off-peak electricity supply, and which is used as an auxiliary energy-storage equipment for renewable energy such as wind or solar energy or is used as an energy source for the remote area.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electrode structure of a vanadium redox flow battery, comprising:
    a proton-exchange membrane;
    two graphite papers, sandwiching the proton-exchange membrane between them;
    two pads, each pad has a single hole or a plurality of holes, the two pads sandwiching the two graphite papers in such a manner that the single hole or the holes of each pad are covered by the two graphite papers;
    two graphite felt units, having a multistrip structure; and
    two graphite polar plates, sandwiching the two pads, each graphite polar plate having one or a plurality of flow channels with a grooved structure on a surface thereof, each graphite felt unit having the multistrip structure being embedded in the flow channels of one of the graphite polar plates, and the two graphite felt units being covered by the two graphite papers, wherein the flow channels are served to allow a first electrolyte and a second electrolyte having vanadium ions in different oxidation states to flow through, and by the electrochemical reactions of the vanadium ions in the first electrolyte and the second electrolyte, an electrical energy is generated and is output to the external load, or the external electrical energy is converted into chemical energy stored in the vanadium ions.

2. The electrode structure according to claim 1, further comprising:
    two metal plates, sandwiching the two graphite polar plates, the metal plates being made of an electric conductive metal including copper; and a lock-fixing device, used for fixing the proton-exchange membrane, the two graphite papers, the two graphite felt units, the two pads, the two graphite polar plates, and the two metal plates all together.

3. The electrode structure according to claim 1, wherein the first electrolyte has divalent and trivalent vanadium ions, and the second electrolyte has tetravalent and pentavalent vanadium ions, and when the external electrical energy is applied onto the vanadium redox flow battery, the trivalent vanadium ions in the first electrolyte are converted to divalent vanadium ions, and the tetravalent vanadium ions in the second electrolyte are converted to pentavalent vanadium ions, and when the electrical energy is output to the external load, the divalent vanadium ions in the first electrolyte are converted to trivalent vanadium ions and the pentavalent vanadium ions in the second electrolyte are converted to tetravalent vanadium ions.

4. The electrode structure according to claim 1, further comprising at least one other graphite polar plate sandwiched by the two graphite polar plates as claimed in claim 1, and two opposite surfaces of each of the other graphite polar plates have a single or a plurality of flow channels with a grooved structure, and other graphite felt units are embedded in the flow channels of the two opposite surfaces of each of the other graphite polar plates, and other graphite papers are provided for covering the other graphite felt units, and two of the other graphite polar plates adjacent to each other sandwich the proton-exchange membrane.

5. The electrode structure according to claim 1, wherein the flow channel has a serpentine flow field, interdigitated flow field, or parallel flow field pattern, and the two graphite polar plates each has two fast joints respectively used for allowing the first or the second electrolyte to be filled in and flow through the flow channel, and then discharged to the external tank, and the width of the flow channel is 2.0 to 10.0 mm, and the depth of the flow channel is 3.0 to 8.0 mm.

6. The electrode structure according to claim 1, wherein the two graphite polar plates are made of natural graphite or artificial graphite, and the thickness of the two graphite polar plates each is 10 to 20 mm, and the bulk density of the two graphite polar plates each is larger than 1.90 g/cm$^3$, and the electrical resistivity of the two graphite polar plates each is smaller than 0.03 mΩ·cm, and an d-spacing ($d_{002}$) in graphite layers of the two graphite polar plates is smaller than 3.38 Å.

7. The electrode structure according to claim 1, wherein the two graphite felt units are made of 2 to 20 μm of carbonized or high-temperature graphitized original fibers of polyacrylonitrile (PAN), mesophase pitch, cellulose, acrylic, phenol, or aromatic polyamide, and the bulk density of the two graphite felt is larger than 0.09 g/cm$^3$ and smaller than 0.20 g/cm$^3$, and the electrical resistivity of each graphite felt unit is smaller than 200 mΩ·cm, and an d-spacing ($d_{002}$) in graphite layers of the two graphite felt units is smaller than 3.5 Å, and the thickness of each graphite felt unit is 3.0 to 8.0 mm.

8. The electrode structure according to claim 1, wherein the two graphite papers are made of 2 to 20 μm of carbonized or high-temperature graphitized original fibers of polyacrylonitrile (PAN), mesophase pitch, cellulose, acrylic, phenol, or aromatic polyamide, and the bulk density of the two graphite papers each is larger than 0.30 g/cm$^3$ and smaller than 0.60 g/cm$^3$, and the electrical resistivity of the two graphite papers each is smaller than 100 mΩ·cm, and an d-spacing ($d_{002}$) in graphite layers of the two graphite papers is smaller than 3.5 Å, and a thickness of the two graphite papers each is 0.1 to 1.0 mm.

* * * * *